United States Patent [19]
Makino et al.

[11] Patent Number: 4,881,062
[45] Date of Patent: Nov. 14, 1989

[54] YARN BREAK DETECTOR FOR SPINNING AND WEAVING MACHINES

[75] Inventors: Syozaburo Makino, Kanagawa; Shouji Hirabayashi, Gifu, both of Japan

[73] Assignee: Nippon Selen Co., Ltd., Kanagawa, Japan

[21] Appl. No.: 219,153

[22] PCT Filed: Dec. 10, 1987

[86] PCT No.: PCT/JP87/00959
 § 371 Date: Jun. 23, 1988
 § 102(e) Date: Jun. 23, 1988

[87] PCT Pub. No.: WO88/04644
 PCT Pub. Date: Jun. 30, 1988

[30] Foreign Application Priority Data

Dec. 15, 1986 [JP] Japan .................. 61-298012

[51] Int. Cl.$^4$ .................................. G08B 21/00
[52] U.S. Cl. .................................. 340/677; 19/0.22; 28/187; 28/242; 66/163; 226/11; 242/37 R; 242/148
[58] Field of Search ............... 340/677; 19/0.26, 0.25, 19/0.22, 0.2; 66/163, 161, 158; 139/353; 28/187, 185, 242, 241, 248; 226/11, 10; 242/148, 29, 37 R; 57/264, 81, 100

[56] References Cited

U.S. PATENT DOCUMENTS

| | | | |
|---|---|---|---|
| 3,911,969 | 10/1975 | Rydborn | 340/677 |
| 4,072,935 | 2/1978 | Rydborn | 57/81 |
| 4,267,554 | 5/1981 | Loepfe et al. | 340/677 |
| 4,455,549 | 6/1984 | Rydborn | 66/161 |
| 4,512,028 | 4/1985 | Stutz | 57/264 |
| 4,768,026 | 8/1988 | Makino | 340/677 |

Primary Examiner—Glen R. Swann, III
Attorney, Agent, or Firm—Koda & Androlia

[57] ABSTRACT

A device for detecting break of any of a plurality of yarns arranged closely to each other in a spinning or weaving machine such as loom, knitting machine, warping machine, etc., includes sensor electrodes disposed in correspondence to the respective yarns, high-input-resistance amplifiers, separators and a logic circuit, in which each yarn is let runs between adjacent separators. When any of the yarns is caused to stop running due to trouble such as a break, the output of the corresponding high-input resistance amplifier becomes high in potential and a signal is issued to the output of the logic circuit to thereby stop the machine while giving an alarm.

2 Claims, 6 Drawing Sheets

YARN BREAK DETECTOR FOR SPINNING AND WEAVING MACHINES

FIELD OF ART

This invention relates to a device for detecting break of yarns arranged at high density in a loom, knitting machine, warping machine and other spinning and weaving machines.

BACKGROUND ART

A plurality of regularly arranged yarns undergo knitting, weaving, take-up and other operations in the looms, knitting machines, warpers and other spinning and weaving machines, and when there takes place break of yarn(s) in such process, it needs to immediately stop the machine and to issue an alarm. If the knitting or weaving and/or take-up operations are allowed to proceed with even a single piece of yarn left broken, there would occur a knitting or weaving flaw or an incorrect mode of take-up, resulting in a serious degradation of the product quality. Also, the broken yarn end may wind round the machine elements to cause a damage thereto. In order to avoid this, various types of yarn break detectors have been proposed and used.

There are known, for instance, a mechanical detection system in which an actuator is attached to a microswitch with yarn let run in contact with said actuator so that, in the event of yarn break, said actuator will detect the loss of yarn tention and operates the microswitch to issue a yarn break signal, and an electronic detection system in which the run and stoppage of yarn are monitored by a photoelectric sensor comprising a light projector, or the yarn run signal is detected by the variation of electrostatic capacity.

However, these yarn break detectors, although adaptable to certain specific types of yarn and yarn arrangements, can not be applied to a machine in which a plurality of yarns are arranged closely to each other.

The yarn detectors of said mechanical system are appliable where the yarn count is large, the yarn running speed is low and the running yarn tention is high, but their scope of use is very limited.

Also, the yarn break detectors of said conventional electronic system, although well filling up the deficiencies of said mechanical system, are still unappliable to all of the yarns arranged at high density, for example, feed yarns in warping and knitting machines, warps in weaving machines, and yarns arranged closely to each other in such a large number as several hundred or more at an interval of about 1 millimeter, such as those placed close to the take-up beam in a warping machine.

This is due to the fact that it is quite difficult to construct the detecting section of the conventional electronic yarn break detectors as a unit of less than 1 millimeter in size, and even if it should be possible to construct said detecting section with a size of several millimeters and to widen the yarn interval, there then arises the problem of high production cost.

As a conventional yarn break detector for yarns arranged at high density, there is known a system in which a light beam is projected adjacent to the arrangement of yarns and should a yarn be broken such yarn hangs down and traverses said light beam, whereupon a signal is issued. This system, however, is still low in accuracy of detection and also subject to limitations in its location of installation.

The present invention has been made in view of said problems of the prior art and has for its object to provide a yarn break detector which is capable of accurately and quickly detecting break of yarns arranged at high density.

It is also an object of this invention to provide a yarn break detector which is small in size and hence not limited in its location of installtion and is also easy to handle and low in cost.

DISCLOSURE OF THE INVENTION

The yarn break detector according to this invention comprises sensor electrodes disposed in correspondence to the respective yarns arranged at high density so that a change of electric charge of any yarn will be induced in the corresponding electrode, high-input resistance amplifiers each of which amplifies the varied potential induced in the corresponding one of said sensor electrodes and issues an output signal by discriminating between run and stoppage of the yarn, grounded conductive separators adapted for shielding said respective sensor electrodes from any outer electric field while guiding said yarns, and a logic circuit having the inputs connected to the outputs of said respective high-input resistance amplifiers, wherein preferably said sensor electrodes and said high-input resistance amplifiers are composed integrally with printed-circuit boards, and also said sensor electrodes and said separators are laminated alternately with each other. Each yarn is let run between every adjoining two separators, and when any of the yarns is caused to stop running, a signal is issued from the output of said logic circuit to stop the machine while giving an alarm. This system enables detection of break of yarns arranged at such a high density as 1 m/m or less yarn interval, and such detection can be effected quickly with safety and high accuracy. Further, the yarn break detector of this invention is simple in structure and composed of inexpensive parts and elements, so that the present device is low in manufacturing cost, small in size, stout and also easy to handle and install.

BEST MODE OF CARRYING OUT THE INVENTION

The present invention will now be described more particularly with reference to the accompanying drawings.

First, the outline of a preferred form of yarn break detector according to this invention will be described by referring to FIG. 1. It will be seen that a plurality of yarns 1a–1n are arranged close to each other, and as many number of sensor electrodes 2a–2n are disposed in opposition to the respective yarns so that a change of electric charge of any yarn will be induced in the corresponding one of said sensor electrodes. Said sensor electrodes $2a-2n$ are connected to the inputs of the corresponding high-input-resistance amplifiers $3a-3n$.

Preferably the sensor electrodes $2a-2n$ and the high-input-resistance amplifiers $3a-3n$ are composed integrally with the printed-circuit boards. Also, said sensor electrodes $2a-2n$ are laminated alternately with the grounded conductive separators $4a-4n$ adapted to shield said electrodes $2a-2n$ from any outer electric field and arranged so that each yarn can run between every two adjoining separators $4a-4n$.

On the other hand, each of said high-input-resistance amplifiers $3a-3n$ is designed to issue an output signal by discriminating between running and stoppage of any of the yarns $1a-1n$. The output signal from any of said high-input-resistance amplifiers is connected to a logic circuit 5 which issues a signal from its output when any of the yarns $1a-1n$ has stopped running, and this output signal is relayed to a control system to stop the machine and give an alarm.

Figure 1:
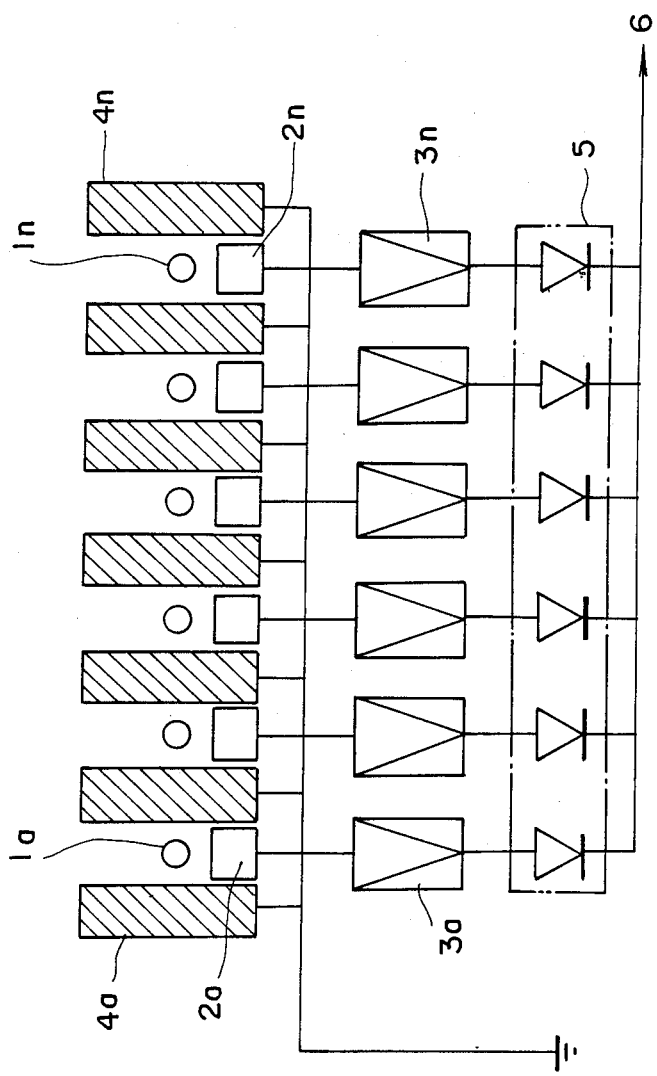
FIG. 1 is a schematic drawing illustrating the structural principle of a preferred embodiment of yarn break detector according/ to this invention.
Figure 2:
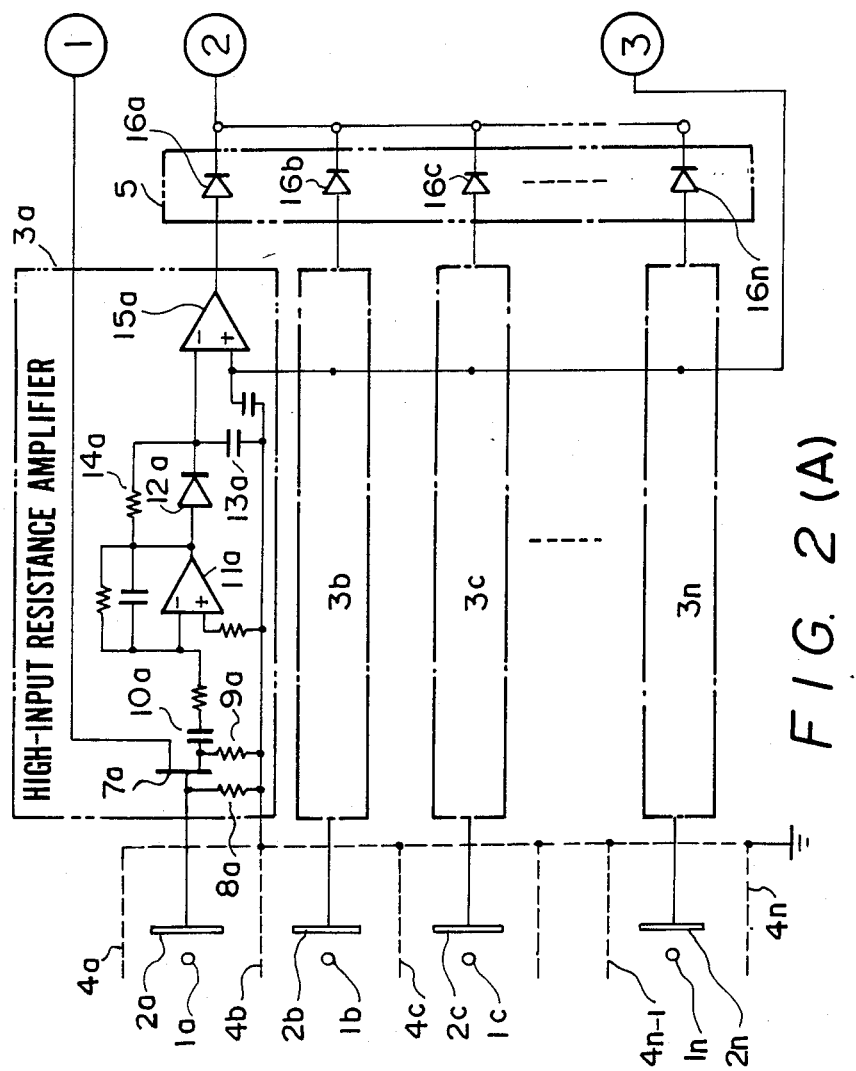
FIGS. 2(A) and 2(B) are the electric circuit diagrams of said yarn break detector.
Figure 2:
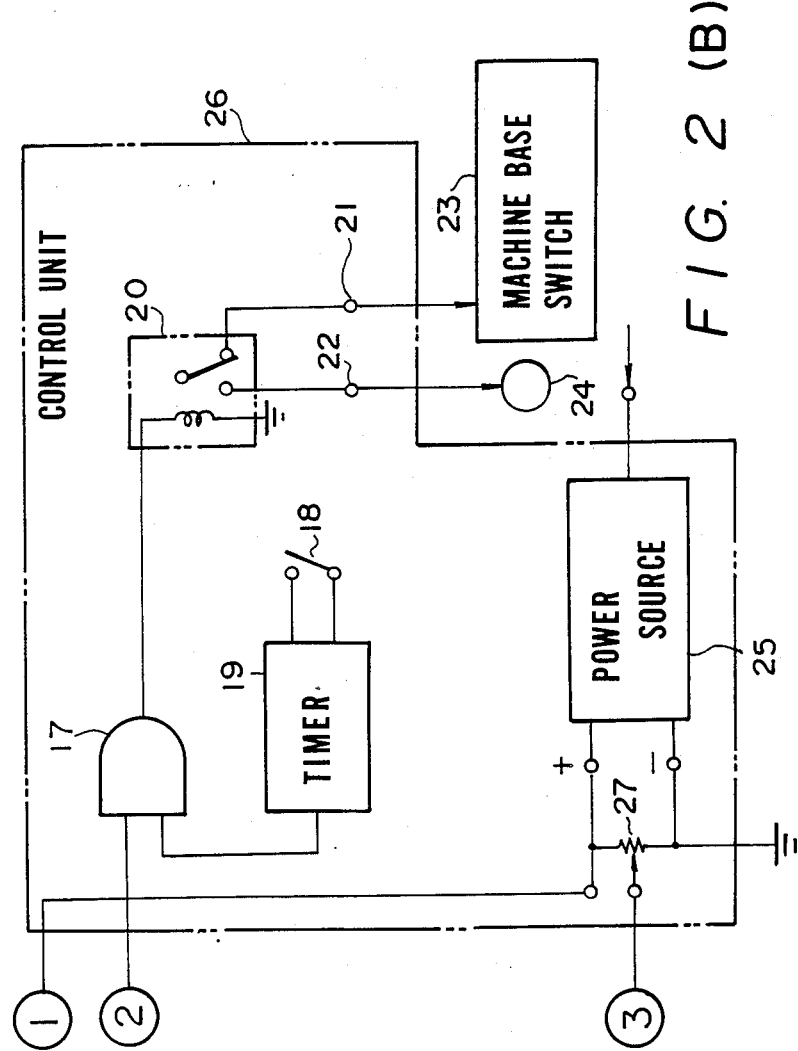

FIGS. 2(A) and 2(B) show the electric circuit diagrams of the yarn break detector shown in FIG. 1.

In FIGS. 2(A) and 2(B), yarns $1a-1n$ are supposed to run in opposition to the respective sensor electrodes $2a-2n$, and therefore the electric charges on said yarns $1a-1n$ are induced in the respective sensor electrodes $2a-2n$.

The induced charges of said sensor electrodes $2a-2n$ are amplified and converted into DC charges by the respective high-input-resistance amplifiers $3a-3n$ and connected to the logic circuit 5. Here, the operation of said high-input-resistance amplifiers $3a-3n$ is explained. Sensor electrode $2a$ is connected to a field effect transistor $7a$ and a leak resistance $8a$ of high resistivity, and the output of said field effect transistor $7a$ is partly grounded via a bias resistor $9a$ and partly connected to the input of an AC amplifier $11a$ through a coupling capacitor $10a$. The output from said AC amplifier $11a$ is rectified and smoothed as it passes through a diode $12a$, a capacitor $13a$ and a resistor $14a$, and a comparison voltage is applied to the other input of a comparison amplifier $15a$ while a signal is sent to the output of said comparison amplifier $15a$ according to the level of one of the input voltages relative to the comparison voltage.

The output of said comparison amplifier $15a$ is given to one of the inputs of a two-and gate 17 via a diode $16a$ constituting a part of the logic circuit 5, while a timer 19 signal controlled by a reset switch 18 is given to the other input of said two-and gate 17. The output of said two-and gate 17 is connected to a relay 20 whose contact point is connected to a shut-down terminal 21 and an alarm terminal 22. Said shut-down terminal 21 and alarm terminal 22 are connected to a machine on/-off switch 23 and an alarm 24.

The control unit 26 shown by a line enclosure comprises a two-and gate 17, a timer 19, a relay 20 and a potentiometer 27 for controlling power source 25 and comparison amplifiers $15a-15n$.

In the above-described circuit system, when a yarn $1a$ is running normally, the induced charge of the sensor electrode $2a$ varies and an alternating output is produced at the output of the field effect transistor $7a$ while its alternating signal is amplified by the AC amplifier $11a$. The amplified signal is rectified by the diode $12a$, whereupon the capacitor $13a$ is charged.

When the minus (−) side potential of the comparison amplifier $15a$ is higher than the comparison voltage of the plus (+) side potential, the output of the comparison amplifier $15a$ is of low potential. Therefore, the output side of the diode $16a$ sends out no signal.

When the yarn $1a$ stops running due to break or other causes, the alternating signal from the output of the field effect transistor $7a$ dies out. Accordingly, the output signal from the AC amplifier $11a$ disappears and the potential of the capacitor $13a$ is discharged by a resistor $14a$, causing a drop of minus (−) potential of the comparison amplifier $15a$. When it becomes lower than the plus (+) side potential, the output from the comparison amplifier $15a$ becomes high in potential, and a signal is produced at the output side of the diode $16a$. The comparison amplifiers are controlled by the potentiometer 27 so that the plus (+) side potential of the comparison amplifier $15a$ will be set within the difference between the minus (−) side potential when the yarn is running and that when the yarn is left stopped. Also, both capacitor $13a$ and resistor $14a$ are provided with a proper time constant so that they won't misoperate upon momentary drop of signal.

In the high-input-resistance amplifiers $3a-3n$ which operates as described above, when any of the yarns $1a-1n$ stops running, the output of the corresponding one of said high-input-resistance amplifiers becomes high in potential and, as a result, a signal is iss0ed to the output of the logic circuit 5 to make one of the inputs of the two-and gate 17 high in potential. The output of the timer 19 is so set that the other input of said two-and gate 17 will always remain high in potential. In this case, therefore, the two-and gate 17 issues an output signal to actuate the relay 20 and as its contact point is connected to the shutdown terminal 21, the machine switch 23 is operated by the output of said shutdown terminal 21 to stop the machine while the alarm 24 is also operated by the output of the alarm terminal 22.

When the machine is operated again after removing the cause of trouble such as yarn break, the reset switch 18 is momentarily connected, whereupon the output of the timer 19 becomes low in potential so that the output signal of the two-and gate 17 dies out to disactuate the relay 20 to turn the machine into the operation mode. The timer 19 is reset upon passage of a certain period of time after start of the machine operaticn, and its output becomes high in potential. Although not shown in the accompanying drawings, it is possible to effect automatic resetting by obtaining a timer reset signal from the output signal from the machine switch 23 or logic circuit 5.

Figure 3:
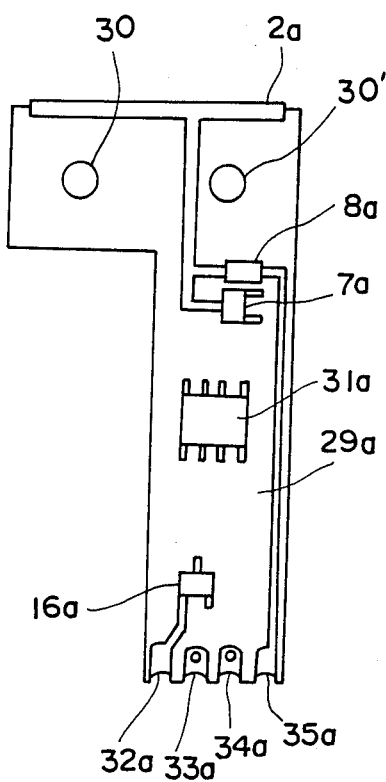
FIG. 3 is a drawing showing the front side of a printed-circuit board on which a sensor electrode and a high-input-resistance amplifier are formed integrally.
Figure 4:
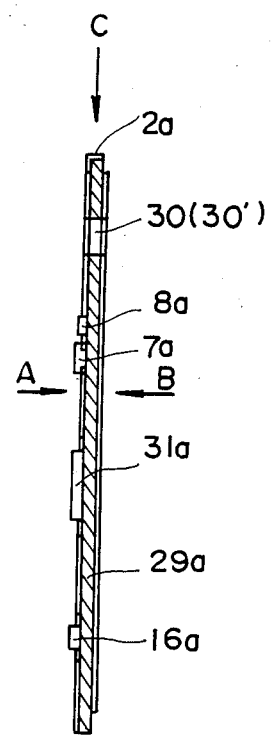
FIG. 4 is a longitudinal sectional view of said printed-circuit board.

FIG. 3 and FIG. 4 show a frontal view and a longitudinal sectional view, respectively, of a sensor electrode $2a$ and a high-input resistance amplifier $3a$ provided as integral parts on a printed-circuit board.

In FIG. 4, arrow A indicates the side where the parts are mounted, arrow B the back side and arrow C the side where the sensor electrodes are provided. The printed-circuit board $29a$ is a 0.5 m/m both-side printed glass epoxy board having the parts mounted on the A side. The B side constitutes substantially a grounded circuit and designed to prevent induction of electricity from the adjoining printed-circuit boards or other elements. A power circuit is also printed at a part on the B side. All of the parts are of chip type, measuring about 1 m/m in thickness. Therefore, the thickness of the printed-circuit board plus the parts mounted thereon is approximately 1.6 m/m. The printed-circuit board $29a$ is provided with the holes 30, 30' designed to be used for assemblage and is cut to an L shape with a shift of about 0.5 m/m from the center for facilitating the alternate assemblage of the similar boards. The sensor electrode 2a is printed on the C side of said printed-circuit board 29a and connected to a field effect transistor 7a and a leak resistor 8a by a printed circuit. The integrated circuit 31a comprises an AC amplifier 11a and a comparison amplifier 15a. The output terminal 32a is shown connected to the diode 16a. Other parts and circuits are not shown here. The terminals 33a, 34a and 35a are connected to comparison voltage, DC plus (+) power source and ground, respectively. The sensor electrode 2a and printed circuit pattern are covered with an insulating coat serving as a resist.

Figure 5:
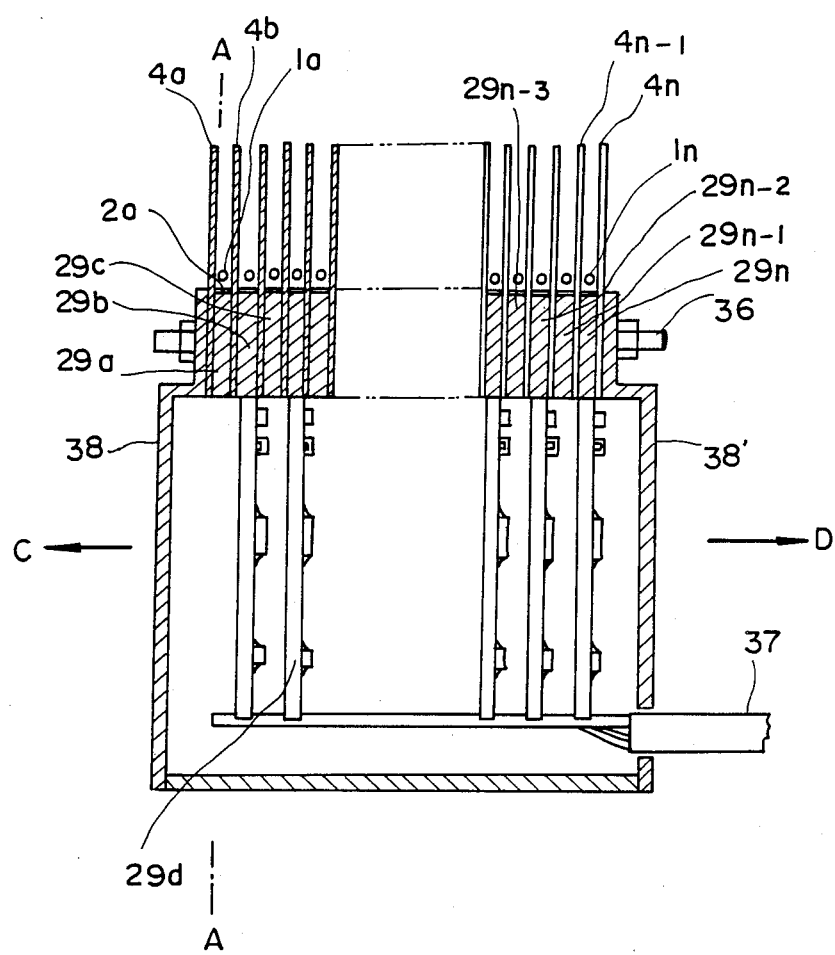
FIG. 5 is a longitudinal sectional view showing the assembled state of the printed-circuit boards and separators.
Figure 6:
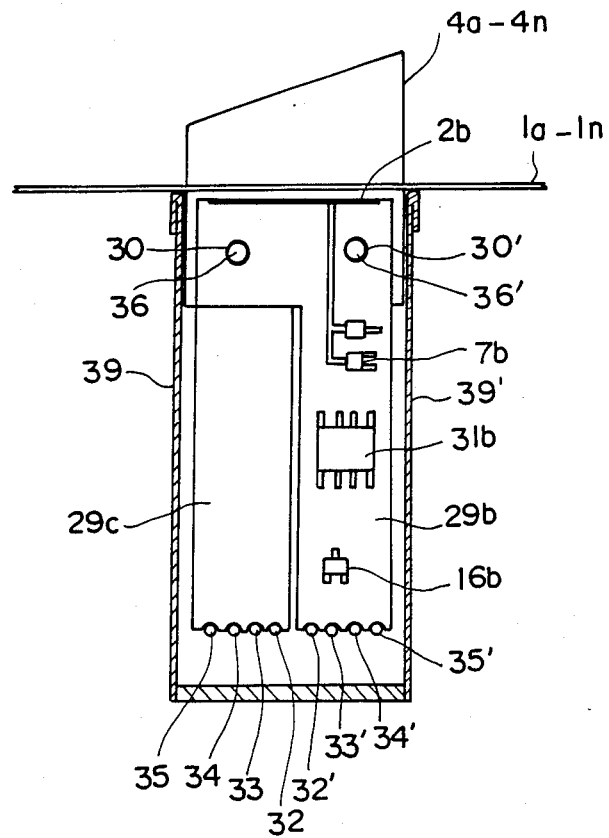
FIG. 6 is a sectional view taken along the line A—A of FIG. 5.

The printed-circuit boards 29a-29n described above are assembled by laminating them alternately with the separators 4a-4n as shown in FIGS. 5 and 6.

FIG. 5 shows a longitudinal sectional view illustraing an assembled state of said printed-circuit boards and separators, and FIG. 6 is a sectional view taken along the line A—A of FIG. 5.

In these drawings, the printed-circuit boards 29a-29n are disposed inversely to each other and assembled alternately with the separators 4a-4n. That is, in FIG. 5, the printed-circuit boards 29a, 29c-29n-3 and 29n-1 are disposed so that their side in the direction of arrow C will be side where the parts are mounted, and the printed-circuit boards 29b, 29d-29n-2 and 29n are so disposed that their side in the direction of arrow D will be the part-mounted side. Each of said separators 4a-4n is made of a 0.3 m/m stainless steel plate and provided with the holes 30, 30' that match with the similar holes in each of said printed-circuit boards 29a-29n. Said separators and printed-circuit boards are secured in position by tightening the screwed ends of the shafts 36,36' passed through said holes 30, 30'. The output terminals 32a-32n, 33a-33n, 34a-34n, 35a-3n of the printed-circuited boards 29a-29n are connected in parallel to each other by terminal wires 32, 33, 35, 35, and 32', 33', 34', 35', respectively. Said terminal wires 32-35 and 32'-35' are combined into a lead 37 and connected to a control unit 26.

Said shafts 36, 36' are secured to the frames 38, 38' and covered by the side plates 39, 39' which serve as a yarn guide.

In the device assembled as described above, the yarns 1a-1n are passed between the separators 4a-4n and in oposition to the respective sensor electrodes 2a-2n printed on the corresponding printed-circuit boards 29a-29n so that said yarn break detecting operations will be performed for each yarn. The above-described method of assemblage has made it possible to set the pitch of yarn arrangement at around 0.8 m/m.

The amount of electric charge induced in each of the sensor electrodes 2a-2n becomes greater as the electrode is arranged to face more accurately the longitudinal direction of the yarn and in closer adjacency thereto, so that the electrode arrangement should be made by giving consideration to such fact. Since the amount of such induced electric charge is affected by the quality, running speed and vibration of the yarn, it is effective to employ a method in which the sensor electrodes 2a-2n are closely attached to the respective separators 4a-4n with an insulator disposed therebetween and the separators 4a-4n are assembled at a suitable interval.

INDUSTRIAL UTILIZABILITY

As described above, the yarn break detector according to this invention can be applied to various types of spinning and weaving machines such as knitting machine, loom, warper, etc., and contributes to automation, labor saving and improvement of product quality as well as maintenance of the machine in these fields of use.

What is claimed is:

1. A yarn break detector comprising sensor electrodes disposed in correspondence to a plurality of closely arranged yarns so that a change of electric charge of yarn will be induced therein, high-input-resistance amplifiers each of which amplifies the varied potential induced in a corresponding one of said sensor electrodes and issues an output signal by discriminating between run and stoppage of said yarn, grounded conductive separators adapted for shielding said sensor lectrodes from any electric field while guiding said yarns, and a logic circuit having inputs connected to the outputs of corresponding ones of said high-input-resistance amplifiers, wherein each of said yarns is let run between two adjoining separators and when any of said yarns is caused to stop running, a signal is issued from the output of said logic circuit to stop the machine processing said yarns while giving an alarm.

2. A yarn break detector according to claim I, wherein said sensor electrodes and said high-input-resistance amplifiers are composed integrally with printed-circuit boards, and said printed-circuit boards and said separators are assembled by laminating them alternately with each other.

* * * * *